UNITED STATES PATENT OFFICE.

CARL JENSEN, OF CHICAGO, ILLINOIS.

COUGH REMEDY.

SPECIFICATION forming part of Letters Patent No. 440,039, dated November 4, 1890.

Application filed September 17, 1890. Serial No. 365,284. (No specimens.)

*To all whom it may concern:*

Be it known that I, CARL JENSEN, of Chicago, in the county of Cook and State of Illinois, have invented certain new and useful Improvements in Medicines; and I do hereby declare the following to be a full, clear, and exact description of the invention, such as will enable others skilled in the art to which it pertains to make and use it.

My invention relates to an improvement in medicines for the treatment of coughs, colds, and lung troubles; and it consists in a mixture of water saturated with pine-tar, the juice of onions, the juice of carrots, rock-candy, white sugar, essence of peppermint and licorice-root.

The object of my invention is to produce a medicine which will greatly relieve coughs and colds of all kinds, catarrh of the lungs, and other lung and throat troubles.

In making my medicine I take onion-juice, four ounces; carrot-juice, four ounces; essence of peppermint, two ounces; rock-candy, one pound; white sugar, three pounds; licorice-root, four ounces; pine-tar water, five pints. Five pints of water are poured over a pint of pine-tar and cooked fifteen minutes, then allowed to stand four hours. The water is then poured off, and to it is added the juices of the onions and carrots, which are extracted by means of pressure or in any other suitable manner from the articles while raw. The other ingredients above mentioned are also put in the same water and then they are cooked together for fifteen minutes.

A dose for a grown person is a tea-spoonful every two hours, and to children a corresponding quantity, according to age.

Having thus described my invention, I claim—

A medicine composed of tar-water, onion-juice, carrot-juice, essence of peppermint, rock-candy, white sugar, and licorice-root, in or about the proportions specified.

In testimony whereof I affix my signature in presence of two witnesses.

CARL JENSEN.

Witnesses:
 HANS M. GRONWOLD,
 CHAS. HOLBECH.